(12) United States Patent
Panchal

(10) Patent No.: US 10,251,075 B1
(45) Date of Patent: Apr. 2, 2019

(54) SYSTEMS AND METHODS FOR COVERAGE AND CAPACITY OPTIMIZING NODES

(71) Applicant: Verizon Patent and Licensing Inc., Arlington, VA (US)

(72) Inventor: Jignesh S. Panchal, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/996,472

(22) Filed: Jun. 2, 2018

(51) Int. Cl.
| | |
|---|---|
| *H04W 40/00* | (2009.01) |
| *H04W 24/02* | (2009.01) |
| *H04W 24/08* | (2009.01) |
| *H04W 52/38* | (2009.01) |
| *H04W 52/34* | (2009.01) |
| *H04W 16/06* | (2009.01) |

(52) U.S. Cl.
CPC ........... *H04W 24/02* (2013.01); *H04W 16/06* (2013.01); *H04W 24/08* (2013.01); *H04W 52/346* (2013.01); *H04W 52/386* (2013.01)

(58) Field of Classification Search
CPC ..... H04W 24/02; H04W 16/06; H04W 24/08; H04W 52/346; H04W 52/386
USPC ........... 455/447, 522, 509, 450, 67.11, 343.2
See application file for complete search history.

(56) References Cited

U.S. PATENT DOCUMENTS

| | | | |
|---|---|---|---|
| 9,369,964 B2* | 6/2016 | Panchal | H04W 52/0251 |
| 2012/0014332 A1* | 1/2012 | Smith | H04W 16/14 370/329 |
| 2012/0207112 A1* | 8/2012 | Kim | H04W 52/146 370/329 |
| 2013/0196677 A1* | 8/2013 | Smith et al. | H04W 72/10 455/452.1 |
| 2013/0203435 A1* | 8/2013 | Smith | H04W 16/14 455/454 |
| 2013/0301609 A1* | 11/2013 | Smith | H04W 72/0493 370/331 |
| 2015/0208366 A1* | 7/2015 | Papasakellariou | ............................ H04W 74/0833 370/311 |
| 2016/0205685 A1* | 7/2016 | Wang | H04L 5/001 370/229 |
| 2018/0234966 A1* | 8/2018 | Somichetty | H04W 72/14 |
| 2018/0279324 A1* | 9/2018 | Wang | H04L 5/0055 |
| 2018/0287870 A1* | 10/2018 | Yerramalli | H04L 41/0816 |

\* cited by examiner

*Primary Examiner* — Marceau Milord

(57) ABSTRACT

A Component Carrier ("CC") controller may monitor usage, by a set of user equipment ("UE"), of radio resources provided by an access node, of a wireless telecommunications network, that utilizes one or more CCs. The CC controller may optimize coverage and/or capacity of the access node by adjusting the number of CCs that are active at the access node, and the power that is allocated for each active CC in response to monitoring radio resource usage that exceeds one or more first thresholds, or monitoring radio resource usage that is below one or more second thresholds.

20 Claims, 9 Drawing Sheets

SYSTEMS AND METHODS FOR COVERAGE AND CAPACITY OPTIMIZING NODES

BACKGROUND

A wireless telecommunications network may experience greater demand because of more intensive data usage and an increasing number of user equipment ("UE") accessing the network. For instance, the wireless telecommunications network may be used to access high definition media content, augmented reality content, virtual reality content, cloud computing services, cloud storage services, autonomous driving-related services, and other data-intensive services or applications. Moreover, the UEs that access the wireless telecommunications network for these and other data services may include smart phones, tablets, Over-The-Top ("OTT") streaming devices, smart sensors, robots, autonomous vehicles, Internet-of-Things ("IoT") devices, and/or other devices. To accommodate the increased demand the wireless telecommunications network may allocate additional capacity using spectrum from higher frequency bands.

DETAILED DESCRIPTION OF PREFERRED EMBODIMENTS

The following detailed description refers to the accompanying drawings. The same reference numbers in different drawings may identify the same or similar elements.

Systems and/or methods, as described herein, may dynamically optimize coverage and capacity at one or more service regions of a wireless telecommunications network. In accordance with some embodiments, a Component Carrier ("CC") controller may optimize coverage and/or capacity at a service region by dynamically adjusting the number of CCs that are active at an access node associated with the service region, and/or by dynamically adjusting the amount of power that is allocated for each active CC. The access node may generate the wireless signaling for the service region, and may provide User Equipment ("UE") access to the wireless telecommunications network via the bandwidth provided by each of the active CCs. An "access node" may refer to a base station (e.g., a Node B ("NB"), an Evolved Node B ("eNB"), a Next Generation Node B ("gNB"), etc.) or other radio resource or node of the wireless telecommunications network.

Figure 1A:
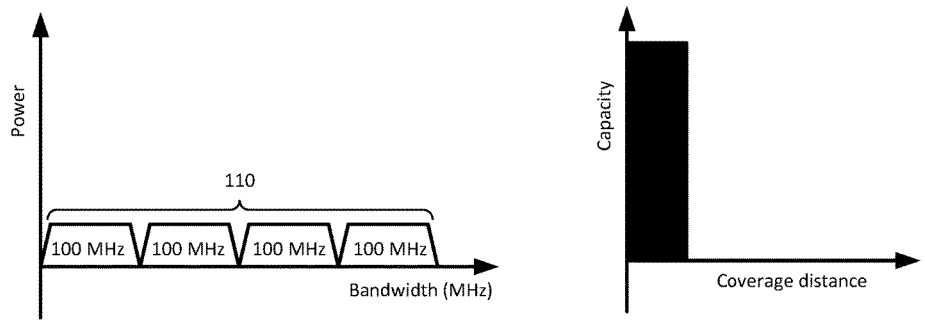
FIGS. 1A-1C illustrate different examples for optimizing coverage and capacity according to one or more embodiments described herein.
Figure 1B:
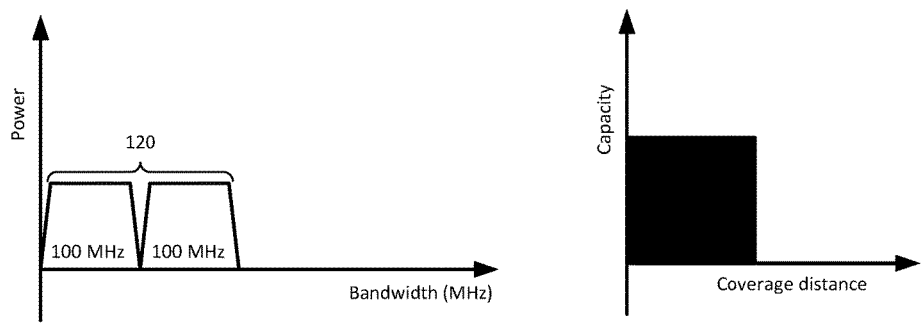
Figure 1C:
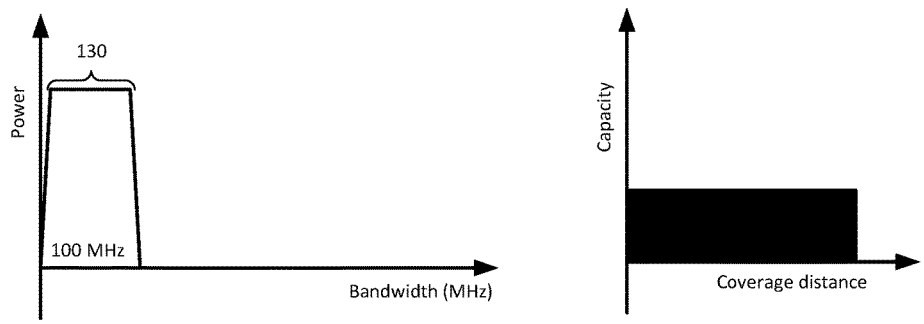

FIGS. 1A-1C illustrate different examples for optimizing coverage and capacity of an access node according to one or more embodiments described herein. FIG. 1A illustrates an example of optimizing an access node for increased capacity. This figure conceptually illustrates that an access node may operate with four active CCs 110, with each having a bandwidth of 100 Megahertz ("MHz"). The transmission of each of the four active CCs 110 from the access node may provide a different non-overlapping amount of frequency spectrum, and therefore additional capacity or bandwidth, over which data, communications, and other signaling may be exchanged between the access node and one or more UEs.

The access node may have a finite total amount of power by which to radiate the active CCs. Stated differently, the use of each CC by the access node may consume some amount of the total power. The coverage, or radiated distance, of each particular CC may be proportional to the amount of power that is used to radiate that particular CC. In FIG. 1A, the access node may utilize each of the four active CCs 110, that collectively provide 400 MHz of bandwidth, using a quarter of the total power available at the access node.

FIG. 1B illustrates an example of optimizing for a balance of capacity and coverage. In this figure, the access node may operate with two active CCs 120 in order to improve coverage with reduced capacity relative to FIG. 1A. The access node may allocate the total radiated power between the two active CCs 120, such that each of the two active CCs 120, that collectively provide 200 MHz of bandwidth, may be radiated with more power (e.g., twice the power) than each of the four active CCs 110, that collectively provide 400 MHz of bandwidth. Consequently, since each of the four CCs 110 in FIG. 1A is operated using less power than each of the two CCs 120 in FIG. 1B, the service region created by the access node in FIG. 1A may have less coverage than the service region created by the access node in FIG. 1B.

FIG. 1C illustrates an example of optimizing for increased coverage. In this figure, the access node may utilize a single CC 130, providing 100 MHz of bandwidth, and may allocate the total radiated power to the single CC 130. Since the single CC 130 may be operated using more power (e.g., the total power available at the access node) than each of the two CCs 120 in FIG. 1B, the service region created by the access node in FIG. 1C may have greater coverage than the service region created by the access node in FIG. 1B. Thus, as illustrated in the examples shown in FIGS. 1A-1C, increasing the quantity of component carriers may generally increase the capacity of an access node, but may reduce the coverage area of the access node. On the other hand, increasing the amount of power that is allocated to each CC by reducing the quantity of CCs that consume the power may increase the coverage area of the access node, but may reduce the capacity of the access node.

As described herein, a CC controller, according to some embodiments, may optimize coverage and/or capacity at a service region based on demand at the service region. In some embodiments, the CC controller may reduce capacity at the service region in order to increase the service region coverage in response to unused capacity of the service region falling below one or more first thresholds. In some embodiments, the CC controller may reduce the service region coverage in order to increase the capacity of the service region.

Figure 2:
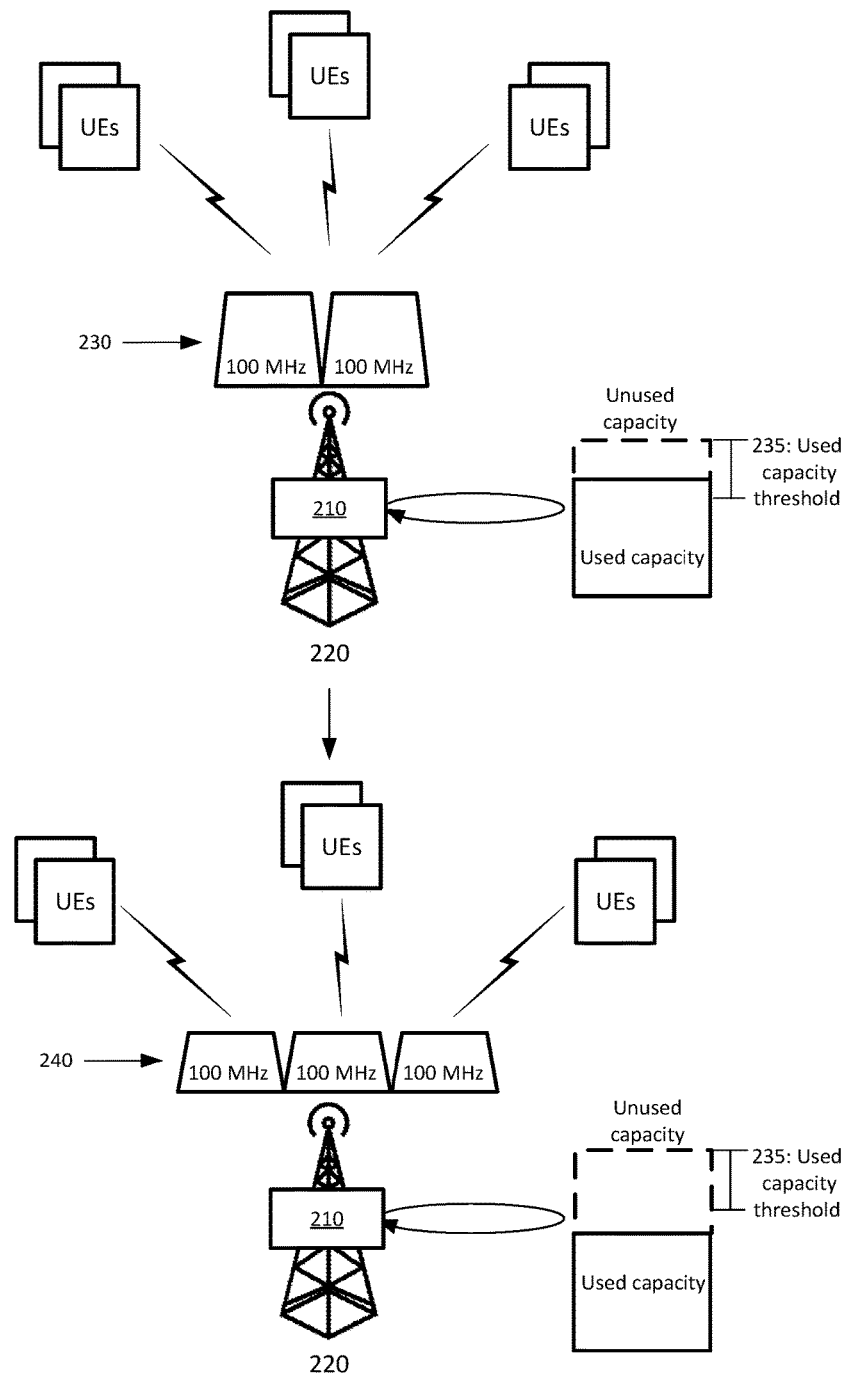
FIG. 2 illustrates an example embodiment in which a Component Carrier ("CC") controller optimizes an access node for additional capacity.

For example, as shown in FIG. 2, CC controller 210 may optimize access node 220 for additional capacity. As shown, access node 220 may initially operate with two active CCs 230. Each CC of the two active CCs 230 may provide 100 MHz of spectrum. CC controller 210 may monitor usage of the capacity provided by the two active CCs 230, and may determine that the used capacity (e.g., data consumption by the UEs operating in the service region generated by access node 220) exceeds a used capacity threshold 235. As shown in the figure, in some embodiments, the used capacity threshold may be measured using the total capacity of access node 220 as a reference point. When the unused capacity is below a threshold level (e.g., when the used capacity exceeds the used capacity threshold 235), CC controller 210 may determine that the quantity of CCs, used by access node 210, should be increased.

In response to the monitored capacity exceeding the used capacity threshold 235, CC controller 210 may modify coverage- and/or capacity-related parameters of access node 220 to improve service relative to the usage. As shown, CC controller 210 may cause access node 220 to increase the number of active CCs of access node 220 from two active CCs 230 to three active CCs 240. CC controller 210 may also modify operational parameters of access node 220 to reduce the power that is allocated to each of the existing two CCs 230 so that there is sufficient power available for the newly activated third CC of the three active CCs 240. The reduction in power for each CC may reduce the distance at which each CC radiates from access node 220, thereby reducing coverage of the service region generated by access node 220. However, the newly add third CC provides access node 220 with an additional 100 MHz of capacity for communicating with UEs operating in the service region served by access node 220. The additional bandwidth may allow for greater UE capacity usage at the service region as a result of access node 220 being able to send and receive additional data without delaying transmission of the data for available bandwidth.

Figure 3:
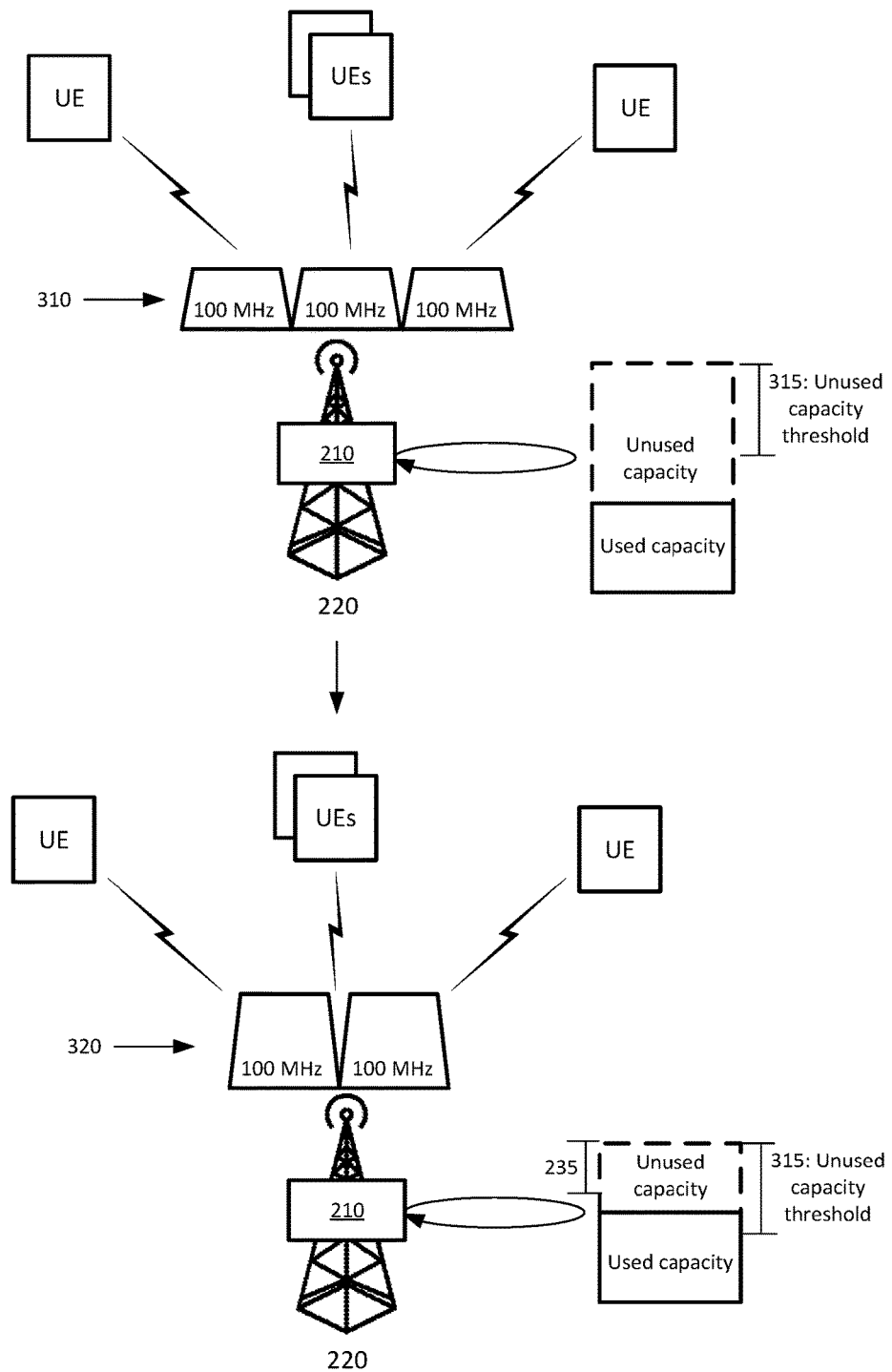
FIG. 3 illustrates an example embodiment in which a CC controller optimizes the access node for additional coverage.

FIG. 3 illustrates an example embodiment in which CC controller 210 optimizes access node 220 for additional coverage. In FIG. 3, access node 220 may initially operate with three active CCs 310. CC controller 210 may monitor usage of the capacity provided by the three active CCs 310, and may determine that the amount of unused capacity (e.g., the total capacity provided by the three active CCs 310 less the current capacity usage by the UEs operating in the service region generated by access node 220) exceeds an unused capacity threshold 315.

In response to determining that the unused capacity exceeds the unused capacity threshold 315, CC controller 210 may modify coverage- and/or capacity-related parameters of access node 210. As shown in FIG. 3, CC controller 210 may deactivate one of the three active CCs 310. CC controller 210 may also modify operational parameters of access node 220 so that the power that was previously allocated for the deactivated CC is reallocated and used to increase the power for each of the remaining two active CCs 320. The coverage of the remaining two active CCs 320 may increase in proportion to the increase in the power. Consequently, UEs may be able to communicate with access node 220 from greater distances.

For illustrative purposes, the used capacity threshold 235 (previously discussed with respect to FIG. 2) is shown here.

Once the operation of access node 220 has been modified by CC controller 210 (e.g., by reducing the quantity of carriers), the resulting used capacity may lower than the used capacity threshold 235, and the resulting unused capacity may be lower than the unused capacity threshold 315.

Figure 4:
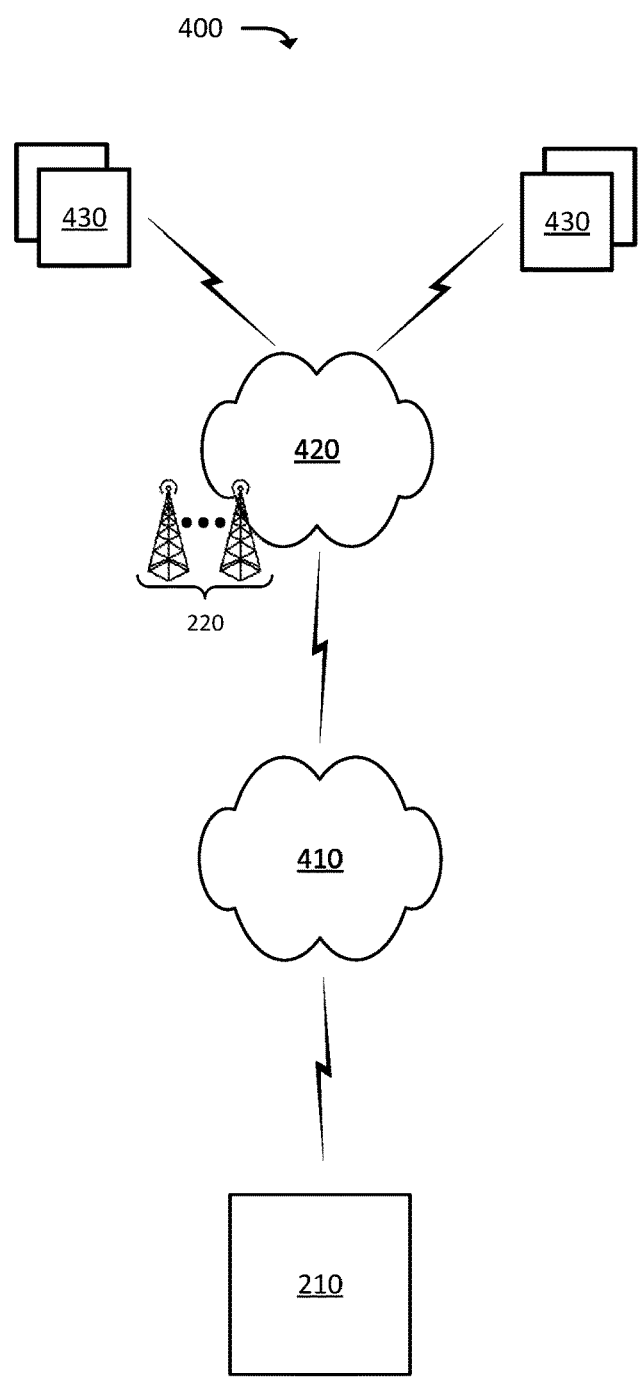
FIG. 4 illustrates an example environment, in which one or more embodiments, described herein, may be implemented.

FIG. 4 illustrates an example environment 400, in which one or more embodiments, described herein, may be implemented. As shown in FIG. 4, environment 400 may include network 410, Radio Access Network ("RAN") 420, CC controller 210, and UEs 430. The quantity of devices and/or networks, illustrated in FIG. 4, is provided for explanatory purposes only. In practice, environment 400 may include additional devices and/or networks; fewer devices and/or networks; different devices and/or networks; or differently arranged devices and/or networks than illustrated in FIG. 4. For example, while not shown, environment 400 may include devices that facilitate or enable communication between various components shown in environment 400, such as network 410 core components (e.g., Serving Gateway ("SGW"), Packet Data Network ("PDN") Gateway, Mobile Management Entity ("MME"), etc.), routers, gateways, etc. Alternatively, or additionally, one or more of the devices of environment 400 may perform one or more functions described as being performed by another one or more of the devices of environments 400. Devices of environment 400 may interconnect with each other and/or other devices via wired connections, wireless connections, or a combination of wired and wireless connections. In some implementations, one or more devices of environment 400 may be physically integrated in, and/or may be physically attached to, one or more other devices of environment 400.

Network 410 may include a core network of a wireless telecommunications network, an IP-based PDN, a wide area network ("WAN") such as the Internet, a private enterprise network, and/or one or more other networks. In some implementations, network 410 may be, or include, a cellular network, such as a Third Generation ("3G") network, a 4G network, an LTE network, a 5G network, a Code Division Multiple Access ("CDMA") network, etc. Network 410 may include, and/or may be connected to, one or more other networks, such as a public switched telephone network ("PSTN"), a PLMN, and/or another network.

RAN 420 may provide one or more service regions for accessing network 410 at different geographic locations. UEs 430 can connect to and access network 410 from one or more of these service regions. RAN 420 may operate at least one access node 220. Each access node 220 may generate the wireless signaling for a different service region of RAN 420. Access node 220 may be, for example, a NB for a 3G implementation of network 410, an eNB for a 4G or LTE implementation of network 410, or a gNB for a 5G implementation of network 410. Each access node 220 may support the same or different maximum number of simultaneously active CCs. For instance, a first access node 220 may support up to eight simultaneously active CCs, and a second access node 220 may support up to four simultaneously active CCs. The maximum number of simultaneously active CCs may be based on licensed spectrum that is available to network 410, the Radio Access Technology ("RAT") (e.g., 3G, 4G LTE, 5G, etc.) supported by network 410 and/or access node 220, radio, power, and/or other physical or other types of constraints or attributes of access node 220. For instance, a first CC may provide capacity via a first 100 MHz carrier from the 28 gigahertz ("GHz") frequency band, and second, third, and fourth CCs may each provide additional capacity or bandwidth via different 100 MHz carriers from the same 28 GHz frequency band. The frequency spectrum of the active CCs radiating from access node 220 may or may not be contiguous or in the same frequency band. Each CC may also provide a different amount of bandwidth by spanning a different frequency spectrum. For example, a CC can span a frequency spectrum of 5 MHz, 10 MHz, 15 MHz, 20 MHz, 40 MHz, 100 MHz, or other frequency spectrum, with each frequency spectrum providing a different amount of bandwidth.

CC controller 210 may be wholly or partially integrated within a particular NB, eNB, gNB, or other access node 220, and may directly monitor and control operational parameters of the particular access node 220. In some embodiments, CC controller 210 may include one or more devices (e.g., a server device or a collection of server devices) that are separate from access nodes 220, and may have a network interface to one or more access nodes 220 (e.g., via network 410). As described herein, CC controller 210 may monitor and control operational parameters of the one or more access nodes 220 or RAN 420 via the network interface. CC controller 210 may also be, or include, a centralized controller that operates from within network 410 (e.g., within a core of a wireless telecommunications network). As a centralized controller, CC controller 210 may have a network interface to one or more access nodes 220 of RAN 420, and may monitor and optimize coverage and capacity for access nodes 220 in RAN 420 via the network interface.

CC controller 210 may identify each access node 220 with a corresponding identifier. For instance, an eNB access node 220 may be identified by an eNB-Identifier ("eNB-ID"). The eNB-ID may be any length, such as 20-bit or 28-bit value, and may encode a Mobile Country Code ("MCC"), Mobile Network Code ("MNC"), and an eNB identifying value. CC controller 210 may issue messaging or commands that modify the operational parameters of a particular access node 220 using the corresponding identifier of the particular access node 220. The messaging may activate or deactivate CCs on the particular access node 220. In some embodiments, the messaging may specify a particular CC to activate or deactivate. For instance, the messaging may specify a particular 100 MHz of frequency spectrum or an identifier of a specific carrier to activate or deactivate. The messaging may alternatively request that the particular access node 220 activate or deactivate one or more CCs, and access node 220 may manage which carriers or CCs to activate or deactivate in response to the request. In some embodiments, the messaging may also specify power for one or more the active CCs at the particular access node 220, or may leave the CC power management to the particular access node 220. In some embodiments, the request may specify an amount of capacity or coverage, and access node 220 may determine the CC changes to satisfy the request.

UEs 430 may each include any computation and communication device that is capable of communicating with one or more networks (e.g., network 410). For example, UEs 430 may include a device that can access voice or calling services provided by network 410, and/or receive content, such as web pages (e.g., that include text content and/or image content), streaming audio and/or video content, and/or other content, via an Internet connection, data services provided by network 410, and/or via some other delivery technique. In some implementations, UEs 430 may be, or may include, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a vehicle (e.g., automobile), an Over-The-Top ("OTT") streaming device, sensor, robot, Internet-of-Things ("IoT") device, a television, a personal gaming system, a wearable device, and/or another type of computation and communication device.

Figure 5:
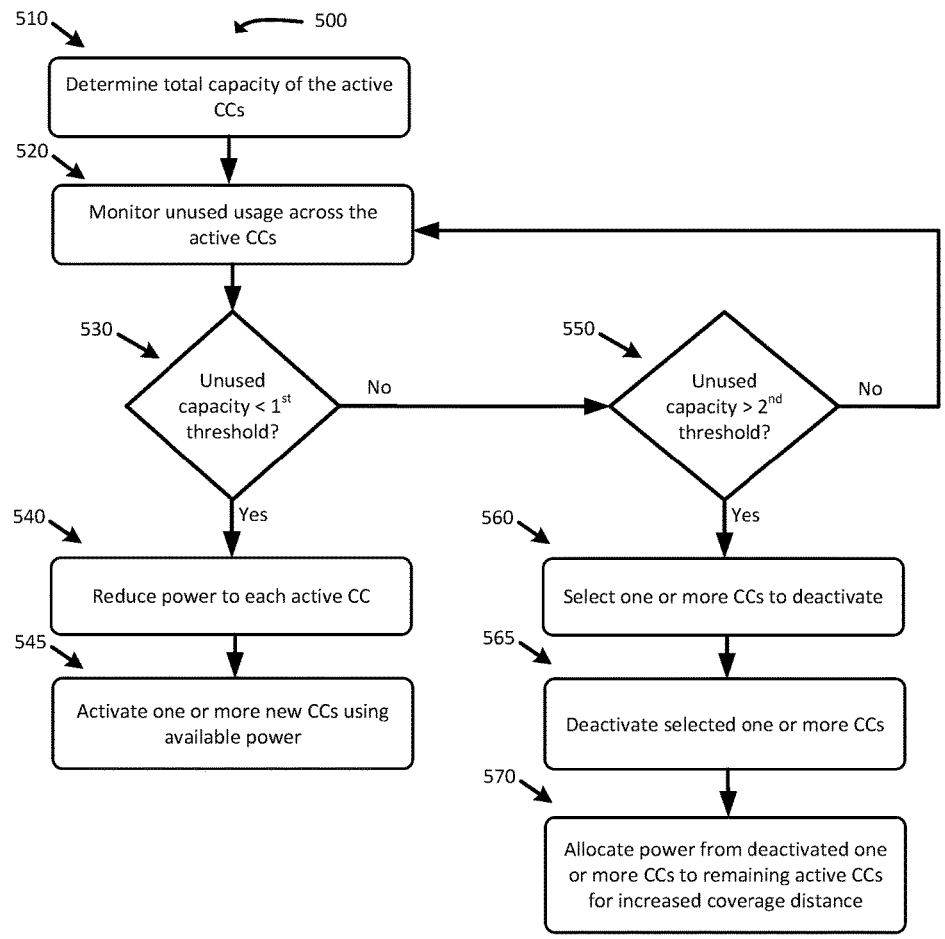
FIG. 5 presents an example process for optimizing coverage and/or capacity according to an implementation described herein.

FIG. 5 presents an example process 500 for optimizing coverage and/or capacity according to an implementation described herein. Process 500 may be performed by CC controller 210 and/or access node 220.

Process 500 may include CC controller 210 determining (at 510) the total capacity of the active CCs at access node 220, and monitoring (at 520) unused capacity of the active CCs. The active CCs may include the one or more CCs that access node 220 uses to communicate across a service region generated by access node 210.

The total capacity may be a function of the bandwidth provided by each CC of the operating CCs. The unused capacity may be determined based on the difference between the total capacity (determined at 510) and the usage of the total capacity. The capacity usage may be defined by an amount of bandwidth that is used by one or more UEs 430 to send and receive data via access node 220. Capacity usage may be an instantaneous value. In other words, capacity usage may change at each instance in time. Accordingly, some embodiments may determine a time-averaged value for the capacity usage. For instance, the time-averaged value may indicate the average used capacity at access node 220 at each second over the last 10 seconds. Accordingly, monitoring (at 520) the unused capacity may also or alternatively include monitoring (at 520) the used capacity.

The unused or used capacity may be represented as a ratio relative to the total capacity. For instance, the unused capacity at a particular point in time may be determined, for each CC, by dividing the unused Physical Resource Blocks ("PRBs") of a CC by the total PRBs of the CC. Each PRB may represent the smallest element of a resource that access node 220 can allocate to a UE, and may include a measure of bandwidth, spectrum, or other capacity metric. An average of the unused capacity of the different CCs at different points in time may then be computed. In some embodiments, usage may be determined in one or more other ways in addition to, or in lieu of, calculating the usage based on used or unused PRBs. For example, usage may be determined by measuring the throughput of data sent or received, via an air interface, by access node 220.

Process 500 may include determining (at 530), by CC controller 210, whether the unused capacity is less than a first threshold. In other words, determining (at 530) whether there is a shortage of available or unused capacity as a result of UE data consumption. The first threshold may be specified as a percentage. For example, the unused capacity may be less than the first threshold when 20% or less of the total capacity is unused. As another example, the unused capacity may be less than the first threshold when 80% or more of the total capacity is used. The first threshold may also be specified as an absolute value. For instance, the first threshold may be set according to a particular throughput value, and the unused capacity may be less than the first threshold when actual throughput is below the particular throughput value. For example, the first threshold may be set to 4 Megabits per second ("Mbps") when access node 220 operates with four active CCs, and the unused capacity may be less than the first threshold when the aggregate data being sent and received by UEs 430 in communication with access node 220 is less than 4 Mbps. As another example, the first threshold may be set according to a quantity of used or unused PRBs. Assume that access node 220 has 100 usable PRBs based on a current number of active CCs. A threshold of 80 PRBs may be defined such that if more than 80 of the 100 PRBs have been allocated for UE communications, CC controller 210 may instruct access node 220 to increase the number of active CCs, and thereby increase the number of usable PRBs.

In response to determining (at 530—Yes) that the unused capacity (e.g., the ratio of unused-to-total capacity) is less than the first threshold, CC controller 210 may optimize access node 220 for additional capacity. For instance, process 500 may include reducing (at 540) power to each active CC of access node 220, and activating (at 545) one or more new CCs using the power that is made available as a result of reducing (at 540) the power to the existing CCs. In some embodiments, CC controller 210 may reduce (at 540) power and activate (at 545) one or more new CCs in response to directly modifying operational parameters of access node 220. In some embodiments, access node 220 may reduce (at 540) power and activate (at 545) one or more new CCs in response to a command from CC controller 210.

The reduction in power may be a function of the total power divided by the total number of simultaneously active CCs. For instance, assume that access node 220 has a total power of 10,000 milliwatts ("mW") or 40 decibel-milliwatts ("dBm"). Access node 220 may allocate 5,000 mW or 37 dBm of power to each of two active CCs. In response to optimizing for capacity and increasing the number of active CCs to three, access node 220 may reduce power for each of the two active CCs from 5,000 mW to 3,333 mW or from 37 dBm to 35 dBm. Access node 220 may then activate the third CC, and allocate a power of 3,333 mW or 35 dBm to the third CC. Activating (at 545) the one or more new CCs may include radiating additional spectrum or bandwidth (e.g., 100 MHz) from access node 220. Access node 220 capacity may increase as a result of the additional spectrum.

Reducing (at 540) the power that is allocated to the active CCs may also increase capacity of access node 220. For instance, reducing the power that is allocated to the active CCs may reduce coverage of the access node 220. The reduced coverage may cause one or more distant UEs to disconnect from access node 220, and/or connect to a different access node. Since the capacity usage by the one or more distant UEs is offloaded from access node 220 as a result of the one or more distant UEs being disconnect, available capacity at access node 220 may increase.

In response to determining (at 530—No) that the unused capacity is not less than the first threshold, process 500 may include determining (at 550) whether the unused capacity of access node 220 (e.g., the ratio of unused-to-total capacity) is greater than a second threshold. For example, CC controller 210 may determine (at 550) whether access node 220 operates too many active CCs that provide excess available or unused capacity.

In response to determining (at 550—Yes) that the unused capacity is greater than the second threshold (e.g., excess unused capacity), CC controller 210 may optimize access node 220 for increased coverage. It may be desirable to utilize the power of access node 220 for added coverage in this situation, because it is not necessary to consume power for the purposes of increased radio capacity (as determined at block 550). Accordingly, process 500 may include selecting (at 560) one or more of the active CCs at access node 220 to deactivate. CC controller 210 may select the one or more active CCs at access node 220 to deactivate based on monitoring (at 520) the unused capacity at each of the active CCs. For instance, CC controller 210 may select (at 560) one or more of the active CCs that are least utilized for deactivation. The selection (at 560) may also be based on a designation of the active CCs as primary and secondary CCs. The primary CCs may handle the Radio Resource Connection ("RRC") with one or more UEs, and may also provide Non-Access Stratum ("NAS") information for managing the establishment of communication sessions, for securing connections, and for maintaining continuous communications with the UEs as they move. The secondary CCs may be auxiliary carriers for boosting data rates. Due to the lack of connection establishment or management occurring over the secondary CCs, the secondary CCs can be activated and deactivated at anytime without affecting UE connectivity. Accordingly, when selecting (at 560) the one or more CCs to deactivate, process 500 may identify and select secondary CCs before primary CCs.

Process 500 may include deactivating (at 565) the selected one or more CCs. For instance, CC controller 210 may issue a deactivation command to access node 220. The deactivation command may identify the selected one or more CCs for deactivation. In response to the command, access node 220 may deallocate the power for the selected one or more CCs, and may stop data access via the spectrum associated with the selected one or more CCs as a result. In some embodiments, CC controller 210 may directly deactivate the selected one or more CCs. For instance, CC controller 210 may adjust the operational parameters that control the active CCs of access node 220, and/or the power that is allocated to the active CCs. By cutting power to a particular CC, CC controller 210 may effectively deactivate the particular CC at access node 220. In some embodiments, CC controller 210 may issue a command to deactivate one or more active CCs to access node 220, and access node 220 may determine which of the active CCs to deactivate, and may deactivate one or more of the CCs by cutting power to CCs selected for deactivation.

In some embodiments, access node 220 may continue without additional modification after deactivating one or more CCs. For instance, access node 220 may conserve power from the one or more deactivated CCs, and access node 220 may operate with a lower total power output. However, when optimizing access node 220 for increased coverage, process 500 may include allocating (at 570) the power, that was previously allocated to the deactivated one or more CCs, to the remaining active CCs. Access node 220 may increase the power for each of the remaining active CCs in response to allocating (at 570) the power. The additional power may radiate the spectrum associated with each of the remaining active CCs a greater distance from access node 220, thereby increasing coverage of the service region generated by access node 220.

In response to determining (at 550—No) that the unused capacity is not greater than the second threshold, no change to coverage or capacity may be needed, as access node 220 may already be operating in an optimal state. With reference back to FIG. 3, access node 220 deactivates one of three CCs 310 because unused capacity was greater than unused capacity threshold 315. After deactivating one of the three CCs 310, access node 220 continued operation with two active CCs 320. As shown FIG. 3, access node 220 operated in an optimal state with two active CCs 320 because unused capacity was reduced back under unused capacity threshold 315, as a result of deactivating one of the three CCs 310, and used capacity did not exceed used capacity threshold 235.

Accordingly, process 500 may continue monitoring (at 520) usage across the active CCs in order to detect an increase or decrease in usage that may affect coverage and capacity of access node 200.

Figure 6:
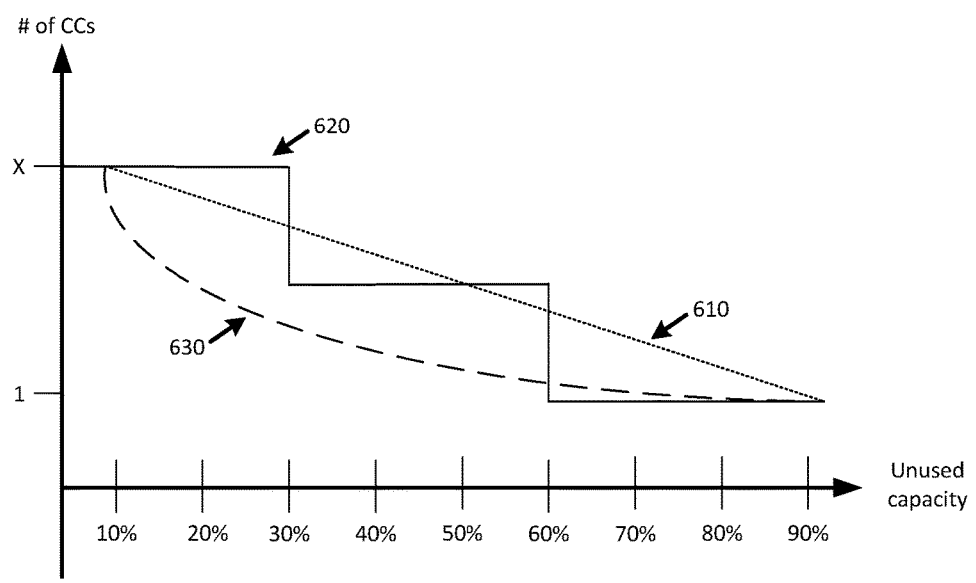
FIG. 6 illustrates examples of a linear function, a step function, and an exponential function that may be used, in accordance with some embodiments, to control the coverage and capacity optimizations.

CC controller 210 and/or access node 220 may determine when and what coverage and capacity optimizations to perform using different functions. FIG. 6 illustrates example linear function 610, example step function 620, and example exponential function 630 that may be used, in accordance with some embodiments, to control the coverage and capacity optimizations.

Each function 610, 620, or 630 may specify a different number of CCs to activate or deactivate at different times. For instance, each function 610, 620, or 630 may be used to define the first threshold for determining (at 530) whether additional capacity, via activating additional CCs, is needed based on capacity usage at access node 220. Similarly, each function 610, 620, or 630 may be used to define the second threshold for determining (at 550) whether additional coverage, via increased power allocation to the active CCs, is needed based on an amount of available capacity at access node 220.

Linear function 610 may gradually increase the number of active CCs and may gradually decrease coverage as the unused capacity decreases or as the used capacity increases. Accordingly, linear function 610 may specify different used capacity thresholds or unused capacity thresholds for each number of active CCs. In other words, if access node 220 supports a maximum of 8 simultaneously active CCs, then linear function 610 may provide 8 different used capacity thresholds or unused capacity thresholds for activating and deactivating each of the 8 CCs.

Step function 620 may retain a coverage and capacity state of access node 220 for a longer time than linear function 610, thereby resulting in fewer optimizations. Each optimization resulting from step function 620 may involve larger changes to capacity or coverage than each optimization resulting from linear function 610. As shown in FIG. 6, step function 620 may include 3 optimizations that occur when unused capacity is less than 30%, unused capacity is between 30% and 60%, and unused capacity is greater than 60%. Each of the 3 optimizations associated with step function 620 may include activating or deactivating two or more CCs.

Exponential function 630 may optimize for capacity more aggressively (e.g., increase the number of CCs added at each optimization) as unused capacity decreases, and may optimize for coverage more slowly (e.g., slow the rate at which coverage distance is increased) as unused capacity increases. A different exponential function may optimize for capacity more slowly (e.g., decrease the number of CCs added at each optimization) as unused capacity decreases, and may optimize for coverage more aggressively (e.g., increase the rate at which coverage distance is increased) as unused capacity increase, or may modify the rate at which to activate or deactivate the CCs.

Linear function 610, step function 620, and exponential function 630 illustrated in FIG. 6 are examples of some possible functions by which CC controller 610 may determine the used or unused capacity thresholds at which to optimize access node 220, and by which CC controller 210 and/or access node 220 may determine one or more CCs to activate or deactivate, and the power to allocate to each active CC. Other functions (e.g., cubic, quadratic, etc.) may also be used in determining when and what optimizations to perform.

In some embodiments, linear function 610, step function 620, exponential function 630, and/or other functions may specify discrete thresholds at which CC controller 210 may adjust the number of active CCs, and may modify power to the active CCs. In some embodiments, CC controller 210 may use an adaptive function to adjust the number of active CCs and power to each active CCs without one or more discrete thresholds.

The adaptive function may be based on a current measure of unused or used capacity at access node 220, and a maximum number of active CCs supported by access node 220. The current measure of unused capacity may be determined by periodically calculating unused capacity for each CC. For example, for each active CC, represented by an index "n", at a given time instance, represented by an index "i", unused capacity for a particular CC at a given time instance ("Cr") may be computed based on the unused PRBs divided by the total PRBs of the particular CC at the given time instance. CC controller 210 may then calculate unused capacity for all active CCs of access node 220, represented by "N", according to equation (1):

$$C_i^{N_i} = \frac{1}{N_i} \sum_{n=1}^{N_i} C_i^n \quad (1)$$

CC controller 210 may determine a long-term average of the unused capacity ("$\tilde{C}_i$") using equation (2):

$$\tilde{C}_i = \min(1, (1-\beta) \cdot \tilde{C}_{i-1} + \beta \cdot C_i^{N_i}) \quad (2)$$

"β" may represent a time filter constant. "β" may have a value less than one.

CC controller 210 may determine a number of CCs to activate or deactivate ("$\Delta N_i$") for time instance "i" according to equation (3):

$$\Delta N_i = [f(\tilde{C}_i, N_{max})] \quad (3)$$

Equation (3) is based on the long-term average of the unused capacity ("$\tilde{C}_i$"), the maximum number of active CCs supported by access node 220, represented by "$N_{max}$", and an adaptive function, represented by "[f( )]". The adaptive function may be any adaptive linear, step, exponential, or other adaptive function. Equation (4) provides an example of an adaptive linear function:

$$N_{max} \cdot (0.5 - \tilde{C}_i) \quad (4)$$

Equation (5) provides an example of an adaptive step function:

$$\begin{array}{l} \frac{N_{max}}{2}, \tilde{c}_i < 0.5 \\ 0, \tilde{c}_i = 0.5 \\ -\frac{N_{max}}{2}, \tilde{c}_i < 0.5 \end{array} \quad (5)$$

Equation (6) provides an example of an adaptive exponential function:

$$N_{max} \cdot \left( e^{-\tilde{c}_i \cdot \frac{N_{max}}{2}} - 0.5 \right) \quad (6)$$

CC controller 210 may then calculate the active CC count for a next time instance ("$N_{i+1}$") based on equation (7):

$$N_{i+1} = \max(1, \min(N_{max}, N_i + \Delta N_i)) \quad (7)$$

"$N_i$" may represent the current active CC count, and as noted above, "$\Delta N_i$" may represent a number of CCs to activate or deactivate. CC controller 210 may determine power to allocate for each active CCs by dividing the total power of access node 220 by the new active CC count "$N_{i+1}$".

In the examples above, access node 220 may evenly distribute power to the active CCs. In some embodiments, access node 220 may provide a differentiated distribution of power to the active CCs. For instance, access node 220 may provide more power for a first CC than a second CC so that the first CC covers a greater range or distance than the second CC. UEs further from access node 220 may connect and communicate with access node 220 via the first CC, and UEs closer to access node 220 may connect and communicate with access node 220 via the second CC.

Figure 7:
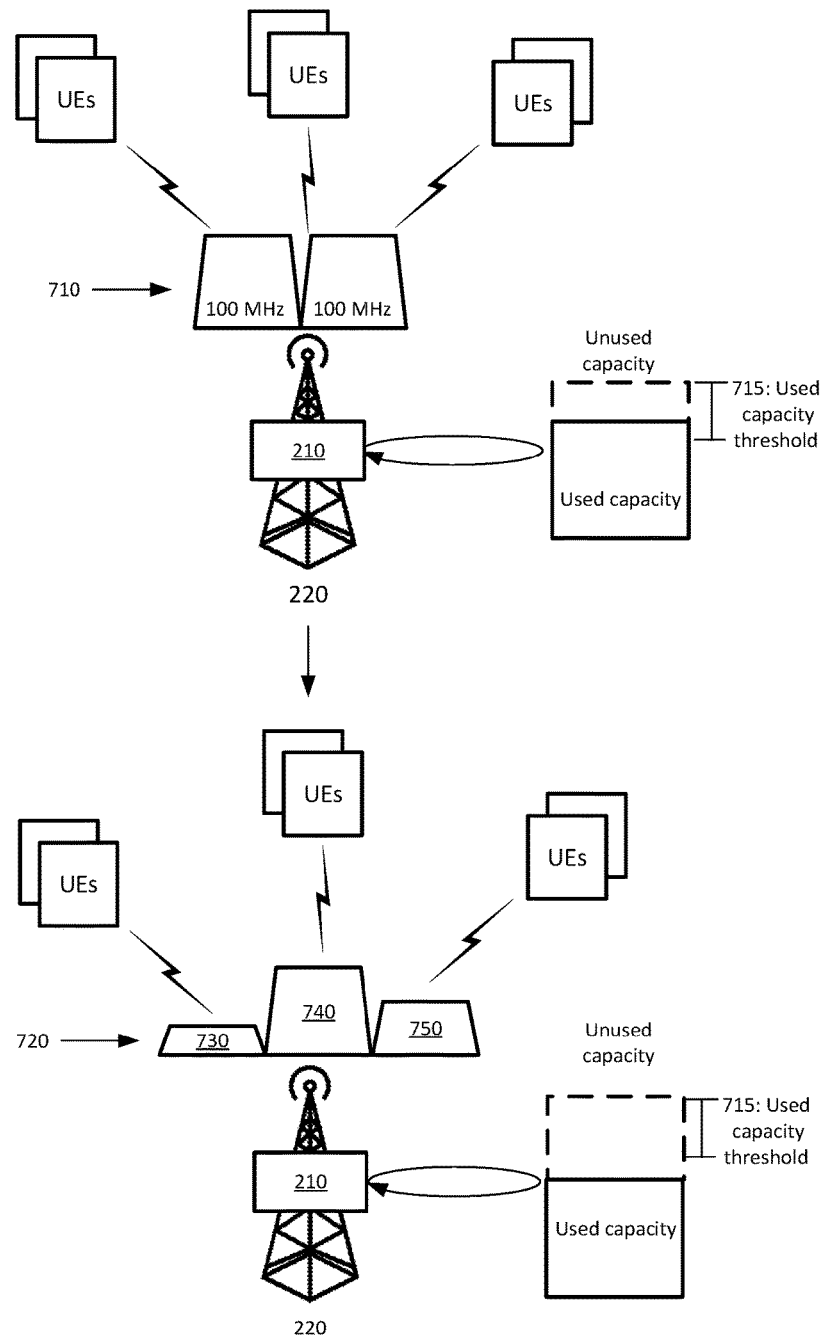
FIG. 7 illustrates an example embodiment in which a CC controller optimizes the access node for additional capacity via a differentiated distribution of power to the active CCs.

FIG. 7 illustrates an example embodiment in which CC controller 210 optimizes access node 220 for additional capacity via a differentiated distribution of power to the active CCs. As shown, access node 220 may initially operate with two CCs 710 that each provide 100 MHz of bandwidth for UEs to send data to and receive data from access node 220. Access node 220 may operate each of the two CCs 710 using an equal amount of power.

CC controller 210 may monitor capacity usage at access node 220, and may determine that the capacity usage exceeds used capacity threshold 715. Accordingly, CC controller 210 may optimize access node 220 for increased capacity. The optimization to access node 220 may include activating a new CC at access node 220 to operate with three active CCs 720, and an additional 100 MHz of bandwidth (e.g., 300 MHz of total bandwidth). However, access node 220 may provide an uneven allocation of power to each of the three active CCs 720, in order to provide differentiated coverage in which the capacity provided by each of the different active CCs may available to UEs at different distances from access node 220.

Figure 8:
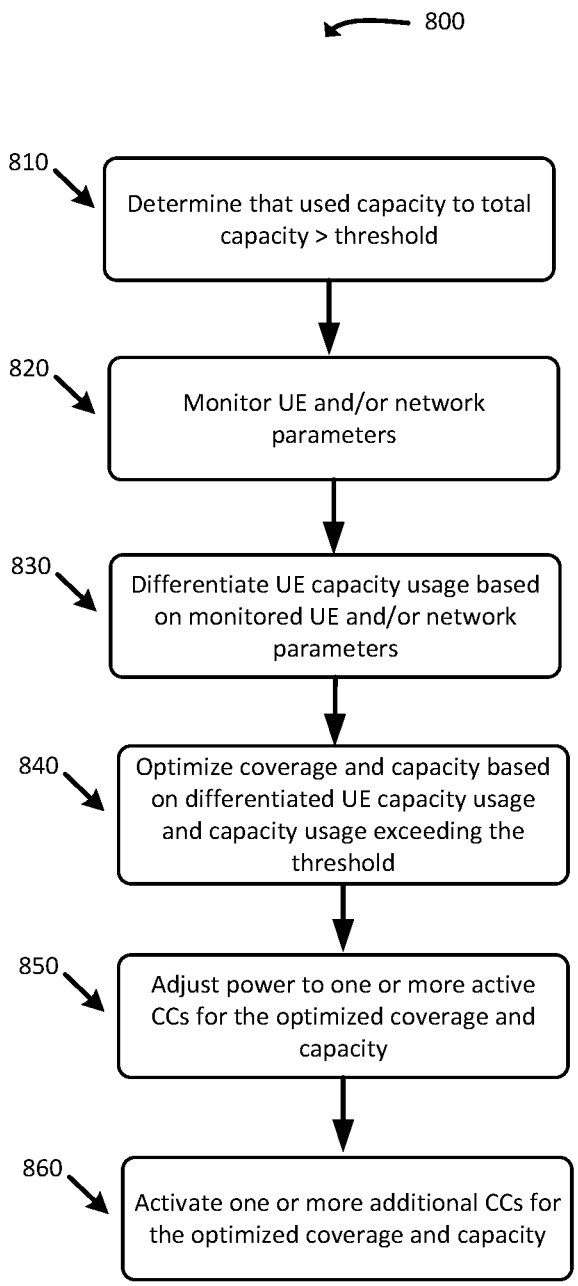
FIG. 8 presents an example process for providing a differentiated power distribution according to an implementation described herein.

For instance, as illustrated in FIG. 7, first CC 730 of the three active CCs 720 has the smallest or shortest radiating distance as a result of being radiated with the least amount of power, second CC 740 of the three active CCs 720 has the largest or furthest radiating distance as a result of being transmitted with the most power, and third CC 750 of the three active CCs 730 has an intermediary coverage. Access node 220 may communicate with UEs that are closest to access node 220 using capacity provided by first CC 730, may communicate with UEs that are furthest from access node 220 using capacity provided by second CC 740, and may use capacity provided by third CC 750 to communicate with other UEs or boost data rates (e.g., provide more bandwidth) for the UEs communicating via first CC 730 and/or second CC 740. For instance, access node 220 may monitor various UE and/or network parameters (e.g., UE signal strength), may allocate one or more sub-carriers (e.g., 10 MHz sub-carriers) from first CC 730 (e.g., 100 MHz carrier) to UEs that are detected to be furthest away from access node 220, and may allocate one or more sub-carriers from second CC 740 to UEs that are detected to be closest to access node 220. Access node 220 may control the allocation of capacity by enhancing radio resource management functions to account for the UE and/or network parameters and the differentiated power allocated to the active CCs. FIG. 8 provides examples of different UE and/or network parameters that may affect the manner with which access node 220 allocates capacity from CCs 720 to different UEs.

CC controller 210 and/or access node 220 may determine the differentiated power allocation as part of optimizing coverage and capacity of access node 220. The determination of how to unevenly allocate the power to the active CCs may be based on one or more UE and/or network parameters.

FIG. 8 presents an example process 800 for providing a differentiated power distribution to different active CCs of access node 220 in response to optimizing access node 220 for capacity and coverage. Process 800 may be performed by CC controller 210 and/or access node 220.

Process 800 may include determining (at 810), by CC controller 210, that the used capacity to total capacity at access node 220 exceeds a used capacity threshold. Accordingly, CC controller 210 may optimize access node 220 for increased capacity via activation of a new CC at access node 220, and for optimal coverage based on an uneven power distribution across the active CCs of access node 220.

To determine the optimal power distribution, process 800 may include CC controller 210 monitoring (at 820) one or more UE and/or network parameters relating to the capacity usage. The UE parameters may include the number of UEs and the Reference Signal Received Power ("RSRP"), Reference Signal Received Quality ("RSRQ"), Received Signal Strength Indication ("RSSI"), and/or signal strength of each of the UEs communicating with access node 220 via one or more of the active CCs. The signal strength may indicate the distance between each of the UEs and access node 220. CC controller 210 may obtain UE parameters from access node 220 based on measurement reports that the connected UEs send to access node 220. For instance, access node 220 may request Channel Quality Indication ("CQI") feedback from the requested UEs. Access node 220 may independently determine UE signal strength or distance by measuring UE reference signal, modulation of data to different UEs, and/or measuring the Signal to Noise Ratio ("SNR"). CC controller 210 may monitor (at 820) other UE and/or network parameters including one or more of the UE type (e.g., smart phone, tablet, autonomous vehicle, sensor, etc.), UE requests, UE authorized services, UE historical access, time of day, access node location, quality-of-service ("QoS"), current coverage distance, and/or other measurable criteria relating to the capacity usage. UE type, UE requests, UE authorized services, and UE historical access may indicate the amount of bandwidth each UE is expected to consume and/or the length and range of capacity usage. Time of day and access node location may indicate future changes to the capacity usage.

Process 800 may include differentiating (at 830), at CC controller 210, UE capacity usage based on the UE and/or network parameters. Differentiating (at 830) the capacity usage may allow CC controller 210 to determine the distance at which different capacity usage occurs. For instance, CC controller 210 may determine a first amount of capacity usage that occurs far from access node 220 at the edge of access node's 220 service region coverage, and a second amount of capacity usage that occurs near access node 220.

Process 800 may include CC controller optimizing (at 840) capacity and coverage of access node 220 based on differentiating (at 830) the UE capacity usage, and determining (at 810) that the used capacity to total capacity at access node 220 exceeds the used capacity threshold. In this case, optimizing capacity and coverage may include determining one or more additional CCs to activate in order to have sufficient bandwidth for the capacity usage, and also selectively deallocating or reducing power from the one or more existing or active CCs so that the new added CCs can be activated while still providing sufficient bandwidth and coverage for capacity usage that occurs at the edge of the service region. For example, CC controller 210 may determine, from differentiating (at 830) the UE capacity usage, that a specific set of UEs that receive a higher QoS (e.g., autonomous vehicles) may operate near the edge of the current coverage, and may use less than 70 MHz of bandwidth. To retain coverage for the specific set of UEs while still increasing capacity, the optimization (at 840) may include retaining or increasing power for a particular CC of the set of active CCs at access node 220. The particular CC may provide 100 MHz of bandwidth. Therefore, by retaining or increasing the power for the particular CC, access node 220 may continue to provide 100 MHz of bandwidth to the specific set of UEs at the service region edge. The optimization (at 840) may further include reducing power and coverage for one or more other CCs of the set of active CCs by a quantity sufficient to activate one or more additional CCs for increasing total available capacity. The power for the one or more other CCs may be reduced equally or unequally depending on where the rest of the capacity usage occurs.

Process 800 may then include adjusting (at 850) the power for the set of active CCs at access node 220, and activating (at 860) one or more additional CCs on access node 220 for the optimized coverage and capacity. To activate (at 860) the one or more additional CCs, access node 220 may transfer the power that was reduced from the set of active CCs to the one or more additional CCs. The activation (at 860) of the one or more additional CCs may increase the total capacity of access node 220. In conjunction with the adjusting (at 850) of the power allocation, the increased total capacity may accommodate current capacity usage with sufficient coverage for where the capacity usage occurs.

Figure 9:
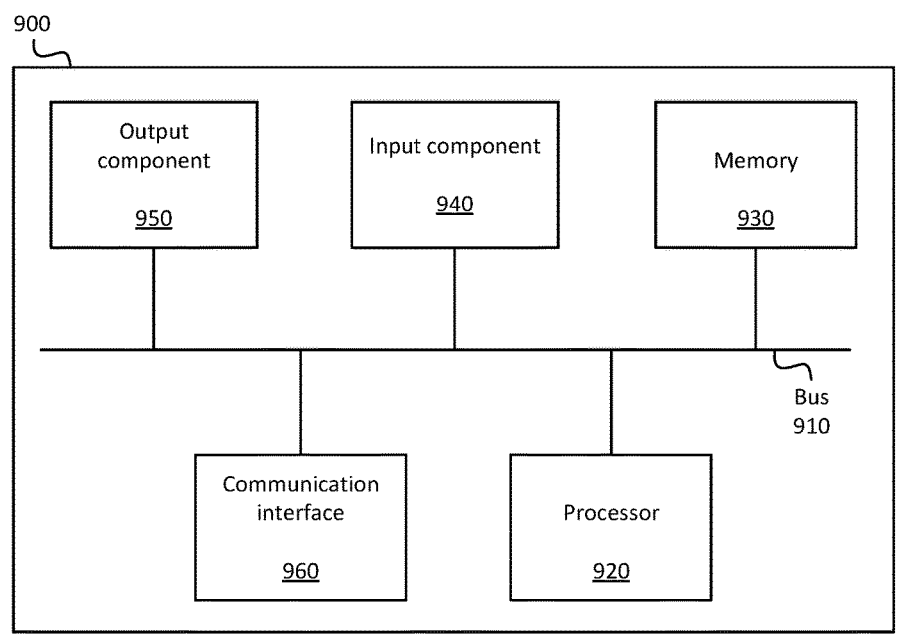
FIG. 9 illustrates example components of one or more devices, according to one or more embodiments described herein.

FIG. 9 is a diagram of example components of device 900. Device 900 may be used to implement certain of the devices described above. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IW") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, CC controller 210 may remotely optimize access node 220 from within the core network of a wireless telecommunications network.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of blocks and/or signals have been described with regard to FIGS. 4 and 8, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" similar terms), as used herein to describe a relationship of a value to a threshold, may be used interchangeably with the term "less than or al to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device comprising:
   a non-transitory computer-readable medium storing a set of processor-executable instructions; and
   one or more processors configured to execute the set of processor-executable instructions, wherein executing the set of processor-executable instructions causes the one or more processors to:
      monitor usage, by a set of user equipment ("UE"), of radio resources provided by an access node, of a wireless telecommunications network, that utilizes one or more component carriers ("CCs");
      determine, based on the monitoring, that the usage of the radio resources provided by the access node exceeds a threshold usage; and
      increase capacity of the radio resources of the access node in response to determining that the usage exceeds the threshold usage, wherein increasing the capacity comprises:
         reducing power allocated to at least one of the one or more CCs, and
         activating at least one additional CC at the access node using at least a portion of the power reduced from the at least one CC, wherein activating the at least one additional CC increases bandwidth provided by the access node from a first capacity, associated with the one or more CCs, to a larger second capacity associated with the one or more CCs and the at least one additional CC.

2. The device of claim 1, wherein the processor-executable instructions further include processor-executable instructions to:
   subsequently determine that the usage of the radio resources provided by the access node has fallen below a second threshold usage; and
   increase a coverage of the access node, wherein increasing the coverage of the access node includes:
      deactivating a first CC of a set of CCs that includes the one or more CCs and the at least one additional CC, and
      increasing power allocated to at least an active second CC remaining in the set of CCs using power that was previously allocated to the first CC, wherein increasing the power increases distance at which the radio resources provided by the access node are accessible.

3. The device of claim 2, wherein the processor-executable instructions further include processor-executable instructions to:
   operate a second CC of the set of CCs as a primary CC handling a Radio Resource Connection ("RRC") with UE;
   operate the first CC of the set of CCs as a secondary CC providing auxiliary bandwidth to the second CC; and
   select the first CC for deactivation based on operating the first CC as the secondary CC and operating the second CC as the primary CC.

4. The device of claim 1, wherein the processor-executable instructions further include processor-executable instructions to:
   determine an operating distance of the set of UEs based on signal strength associated with each UE of the set of UEs;
   allocate an even amount of power to each CC, of the one or more CCs, after reducing the power in response to the operating distance being less than a threshold distance from the access node; and
   allocate a different amount of power to each CC of the one or more CCs after reducing the power in response to the operating distance of at least one UE being greater than the threshold distance from the access node.

5. The device of claim 1, wherein the processor-executable instructions further include processor-executable instructions to:
   determine a measure usage of each CC of the one or more of CCs; and
   select a particular CC of the one or more CCs for deactivation based on the measure of usage of the particular CC being less than the measures of usage of other CCs of the one or more CCs.

6. The device of claim 1, wherein each CC of the one or more CCs is between about 5 MHz and about 100 MHz wide.

7. The device of claim 1, wherein the processor-executable instructions further include processor-executable instructions to:
   determine an amount of power to reduce from the at least one CC and a number of additional CCs to activate according to a function and the usage.

8. The device of claim 7, wherein the function is one of a linear function, a step function, or an exponential function.

9. At least one non-transitory computer-readable medium, storing a set of processor-executable instructions, which, when executed by one or more processors, cause the one or more processors to:

monitor usage, by a set of user equipment ("UE"), of radio resources provided by an access node, of a wireless telecommunications network, that utilizes one or more component carriers ("CCs");

determine, based on the monitoring, that the usage of the radio resources provided by the access node exceeds a threshold usage; and increase capacity of the radio resources of the access node in response to determining that the usage exceeds the threshold usage, wherein increasing the capacity comprises:
- reducing power allocated to at least one of the one or more CCs, and
- activating at least one additional CC at the access node using at least a portion of the power reduced from the at least one CC, wherein activating the at least one additional CC increases bandwidth provided by the access node from a first capacity, associated with the one or more CCs, to a larger second capacity associated with the one or more CCs and the at least one additional CC.

10. The at least one non-transitory computer-readable medium of claim 9, wherein the processor-executable instructions further include processor-executable instructions to:
- subsequently determine that the usage of the radio resources provided by the access node has fallen below a second threshold usage; and
- increase a coverage of the access node, wherein increasing the coverage of the access node includes:
  - deactivating a first CC of a set of CCs that includes the one or more CCs and the at least one additional CC, and
  - increasing power allocated to at least an active second CC remaining in the set of CCs using power that was previously allocated to the first CC, wherein increasing the power increases distance at which the radio resources provided by the access node are accessible.

11. The at least one non-transitory computer-readable medium of claim 10, wherein the processor-executable instructions further include processor-executable instructions to:
- operate a second CC of the set of CCs as a primary CC handling a Radio Resource Connection ("RRC") with UE;
- operate the first CC of the set of CCs as a secondary CC providing auxiliary bandwidth to the second CC; and
- select the first CC for deactivation based on operating the first CC as the secondary CC and operating the second CC as the primary CC.

12. The at least one non-transitory computer-readable medium of claim 9, wherein the processor-executable instructions further include processor-executable instructions to:
- determine operating distance of the set of UEs based on signal strength associated with each UE of the set of UEs;
- allocate an even amount of power to each CC of the one or more CCs after reducing the power in response to the operating distance being less than a specific distance from the access node; and
- allocate a different amount of power to each CC of the one or more CCs after reducing the power in response to the operating distance of at least one UE being greater than the specific distance from the access node.

13. The at least one non-transitory computer-readable medium of claim 9, wherein the processor-executable instructions further include processor-executable instructions to:
- determine a measure of usage of each CC of the one or more of CCs; and
- select a particular CC of the one or more CCs for deactivation based on the measure of usage of the particular CC being less than the measures of usage of other CCs of the one or more CCs.

14. The at least one non-transitory computer-readable medium of claim 9, wherein each CC of the one or more CCs is between about 5 MHz and about 100 MHz wide.

15. The at least one non-transitory computer-readable medium of claim 9, wherein the processor-executable instructions further include processor-executable instructions to:
- determine an amount of power to reduce from the at least one CC and a number of additional CCs to activate according to a function and the usage.

16. The at least one non-transitory computer-readable medium of claim 15, wherein the function outputs the number of additional CCs to activate based on available capacity at the access node and a maximum number of CCs supported by the access node, and wherein the function outputs an amount of power to allocate to the at least one CC based on a total radiated power of the access node and a total number of active CCs at the access node, wherein the total number of active CCs includes the number of additional CCs to activate.

17. A method comprising:
- monitoring usage, by a set of user equipment ("UE"), of radio resources provided by an access node, of a wireless telecommunications network, that utilizes one or more component carriers ("CCs");
- determining, based on the monitoring, that the usage of the radio resources provided by the access node exceeds a threshold usage; and
- increasing capacity of the radio resources of the access node in response to determining that the usage exceeds the threshold usage, wherein increasing the capacity comprises:
  - reducing power allocated to at least one of the one or more CCs, and
  - activating at least one additional CC at the access node using at least a portion of the power reduced from the at least one CC, wherein activating the at least one additional CC increases bandwidth provided by the access node from a first capacity, associated with the one or more CCs, to a larger second capacity associated with the one or more CCs and the at least one additional CC.

18. The method of claim 17, further comprising:
- subsequently determining that the usage of the radio resources provided by the access node has fallen below a second threshold usage; and
- increasing a coverage of the access node, wherein increasing the coverage of the access node includes:
  - deactivating a first CC of a set of CCs that includes the one or more CCs and the at least one additional CC, and
  - increasing power allocated to at least an active second CC remaining in the set of CCs using power that was previously allocated to the first CC, wherein increasing the power increases distance at which the radio resources provided by the access node are accessible.

19. The method of claim 18, further comprising:
operating a second CC of the set of CCs as a primary CC handling a Radio Resource Connection ("RRC") with UE;
operating the first CC of the set of CCs as a secondary CC providing auxiliary bandwidth to the second CC; and
selecting the first CC for deactivation based on operating the first CC as the secondary CC and operating the second CC as the primary CC.

20. The method of claim 17, further comprising:
determining the usage of the first amount of bandwidth based on usage of bandwidth associated with each CC of the set of CCs;
selecting a particular CC of the set of CCs for deactivation based on the usage of the bandwidth associated with the particular CC being less than the usage of the bandwidth associated with other CCs of the set of CCs.

* * * * *